United States Patent [19]

Haskins

[11] Patent Number: 5,446,937
[45] Date of Patent: Sep. 5, 1995

[54] MODULAR RAMP SYSTEM

[75] Inventor: Craig A. Haskins, Ventura, Calif.

[73] Assignee: Pemko Manufacturing Company, Ventura, Calif.

[21] Appl. No.: 941,743

[22] Filed: Sep. 8, 1992

[51] Int. Cl.$^6$ ............................................. E01D 15/12
[52] U.S. Cl. ........................................ 14/69.5; 254/88
[58] Field of Search .................. 14/69.5, 71.1; 254/88; 193/38, 41; 52/588, 630, 177, 581; 404/35, 41; 446/128, 444; 472/116, 117

[56] References Cited

U.S. PATENT DOCUMENTS

| | | |
|---|---|---|
| D. 85,226 | 9/1931 | Awbrey . |
| 324,732 | 8/1885 | Schreiber . |
| D. 346,256 | 4/1994 | Thomas, III et al. . |
| 426,209 | 4/1990 | McIntyre . |
| 1,480,980 | 12/1969 | Yoon et al. . |
| 1,493,475 | 5/1924 | Cook . |
| 1,658,444 | 2/1928 | King . |
| 1,966,402 | 2/1934 | Barringer . |
| 2,436,467 | 2/1948 | Winter . |
| 2,851,744 | 9/1958 | Oehmig . |
| 3,079,652 | 3/1963 | Wahlfeld . |
| 3,142,872 | 8/1964 | Meyer . |
| 3,153,798 | 10/1964 | Drevitson . |
| 3,273,287 | 9/1966 | Pease, Jr. . |
| 3,423,780 | 1/1969 | Alten ........................ 14/69.5 |
| 3,555,762 | 1/1971 | Costanzo, Jr. .............. 52/588 |
| 3,859,000 | 1/1975 | Webster . |
| 3,984,891 | 10/1976 | Weinmann ................. 14/69.5 |
| 4,228,623 | 10/1980 | Menosso .................. 52/79.4 X |
| 4,468,910 | 9/1984 | Morrison . |
| 4,654,245 | 3/1987 | Balzer et al. ............ 52/177 X |
| 4,697,294 | 10/1987 | Schafer . |
| 4,817,224 | 4/1989 | Visnaw et al. . |
| 4,826,351 | 5/1989 | Haberhauer et al. . |
| 4,853,999 | 8/1989 | Smith ........................ 14/69.5 |
| 4,860,952 | 8/1989 | Schmidt . |
| 4,912,796 | 4/1990 | Crump . |
| 4,920,596 | 5/1990 | Stevens .................... 14/69.5 |
| 4,973,505 | 11/1990 | Bielous . |

FOREIGN PATENT DOCUMENTS

| | | | |
|---|---|---|---|
| 1243588 | 6/1967 | Germany ................. 14/71.1 |
| 2223256 | 4/1990 | United Kingdom ........ 14/69.5 |

OTHER PUBLICATIONS

Zero International, Inc. 1991 Catalog; p. 11.
National Guard Products, Inc. 1991 Commercial Catalog; p. 19.
Reese 1991 Catalog; p. 13.
Ultra Industries 1991 Catalog; p. 9.
Pemko 1991/1992 Full Line Catalog.
U.S. patent application serial No. 07/941,990, filed Sep. 8, 1992.

*Primary Examiner*—Ramon S. Britts
*Assistant Examiner*—James A. Lisehora
*Attorney, Agent, or Firm*—Spensley, Horn, Jubas & Lubitz

[57] ABSTRACT

A modular ramp system for use with a threshold which has an offset. The modular ramp system includes a number of elements which may be arranged in various combinations in order to conform to offsets of varying height.

4 Claims, 9 Drawing Sheets

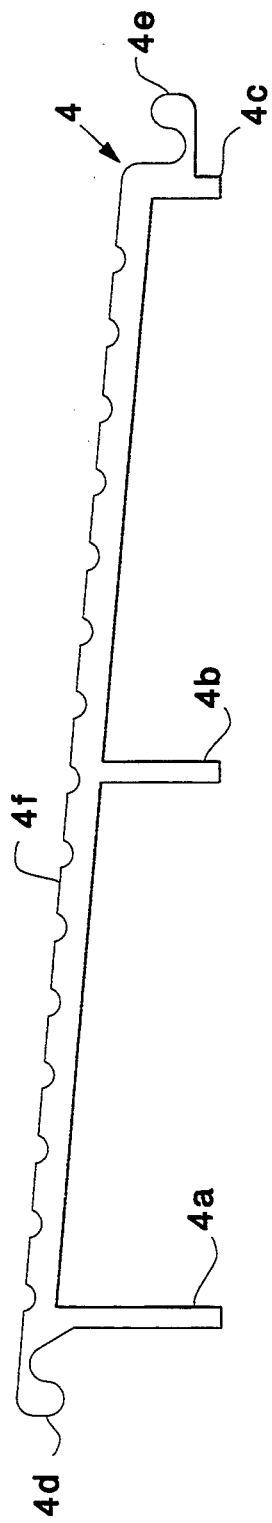
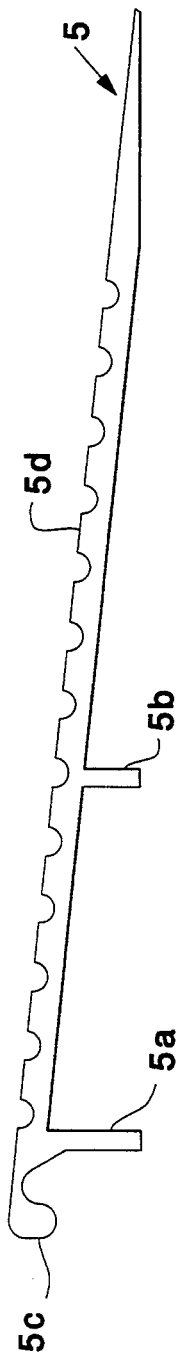
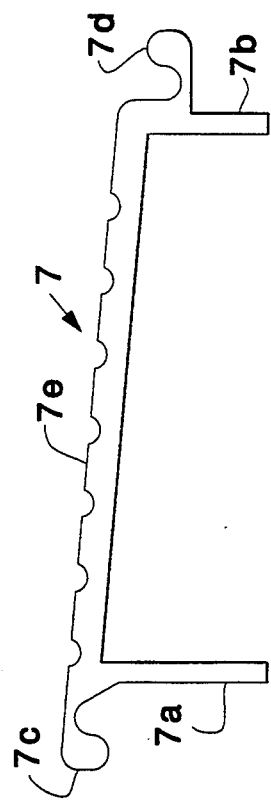
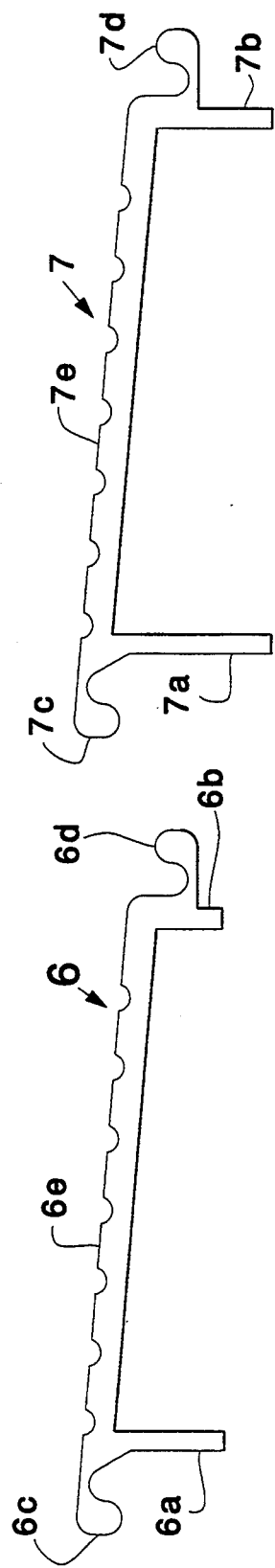
Figure 5
Figure 6
Figure 8
Figure 7

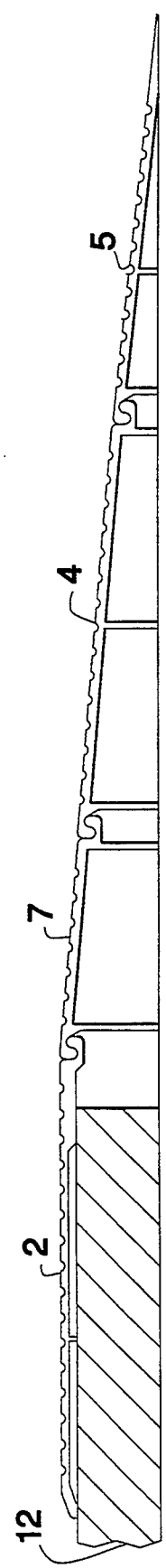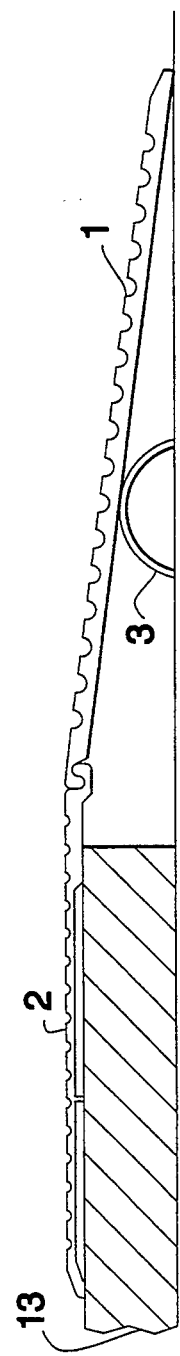

MODULAR RAMP SYSTEM

BACKGROUND OF THE INVENTION

1. Field of the Invention

The present invention is directed to a modular ramp system which can be assembled with a threshold in order to facilitate passage of, inter alia, wheeled vehicles including wheelchairs through doorways and other entrance ways.

2. Description of the Related Art

Ramps which can be fitted to thresholds in order to facilitate travel by wheelchairs and other wheeled vehicles over the threshold are already known in the art. Examples of such structures are shown in FIGS. 18–20.

FIG. 18 shows a metal component, or member, 20 constructed to form part of a ramp that can facilitate passage over a step 11 which may be located at a doorway or may simply be a change in elevation of a floor or walkway. Such a step may, as indicated in FIG. 18, have a height of a ½". These steps can have other heights and are often referred to in the art as an "offset", which term will be employed hereinafter. Component 20 presents an upper surface having a horizontal portion 21, a relatively long sloping ramp portion 22 and a relatively short sloping ramp portion 23.

An additional ramp component can be placed adjacent ramp portion 22 to provide a ramp surface which extends to the level of the floor or walkway.

This additional component may be a preformed concrete ramp component or a metal ramp component such as the component, or member, 25 shown in FIG. 19.

As shown in FIG. 19, component 25 may be used alone as a ramp whose high end abuts offset 11. In FIG. 20, components 20 and 25 are placed together to abut one another and firm the complete ramp described above.

Reverting to FIG. 18, ramp portion 23 can be somewhat steeper than ramp portion 22 because of its smaller total length.

One of the major problems associated with modular threshold ramps is that the respective ramp members tend to slide apart and create a safety hazard. The prior art attempts to solve this problem by welding the ramp members together during installation. For example, abutting vertical legs of components 20 and 25 of FIG. 20 could be welded together. Welding, however, adds significant time and expense to the installation process. Additionally, if one of the ramp members is damaged, the weld must be broken in order to replace the damaged member. Breaking the weld may cause damage to the other ramp member, thus necessitating the replacement of the previously undamaged portion of the ramp. Accordingly, welding adds significant time and expense to the removal and replacement of damaged portions of the modular ramp.

Another problem often encountered results from the fact that there are a number of standard threshold offset heights and that when threshold ramps are first installed and/or retrofitted, there are often numerous limitations placed on particular ramp dimensions. For example, under the Americans with Disabilities Act of 1990 Accessibility Guidelines (ADAAG), the slope of threshold ramps must be 1:12 for new buildings and can be retrofitted to a maximum of 1:8 in some existing buildings. Accordingly, the dimensions of prefabricated threshold ramps must be individualized for each standard offset height in order to meet the threshold ramp slope requirements. Moreover, prior to retrofit of an existing building, the height of all of the threshold offsets in the building must be measured so that the proper number of each size of prefabricated ramp can be ordered. Thus, the necessity of using prefabricated ramps adds significant time and expense to the retrofit process.

A similar problem relates to the fact that not all threshold offsets are one of the standard heights (½", ¾", etc). Prefabricated threshold ramps are useless in such situations and a custom threshold ramp must be produced at great expense.

SUMMARY OF THE INVENTION

It is an object of the present invention to provided an improved modular threshold ramp system obviating for practical purposes the above-mentioned limitations. More specifically, it is an object of the present invention to provide a threshold ramp system which may be readily assembled, disassembled, and adapted to threshold offsets of varying height.

In accordance with the present invention, these and other objectives are achieved by providing a threshold ramp system comprising a plurality of ramp members which may be mechanically attached to one another. Additionally, the respective ramp members may be of varying height. The advantages of these features will be discussed below.

Ramp members which may be mechanically attached to one another provide a number of advantages. First, as welding (as well as other similar means of permanent attachment) is not required, the ramps may be easily installed. This results in a substantial savings of time and money as compared to the prior art. Additionally, if one of the ramp members is damaged, it may be removed easily and without damage to the other ramp members. Again, the result is a significant savings in time and money.

Ramp members which vary in height may be selectively combined such that a predetermined slope requirement may be met for threshold offsets of varying height. Thus, a single threshold ramp kit containing ramp members which vary in height may be supplied for each threshold. Accordingly, the need to measure the height of the threshold offsets prior to installation, as well as associated costs, are eliminated.

BRIEF DESCRIPTION OF THE DRAWINGS

A detailed description of the preferred embodiments of the invention will be made with reference to the accompanying drawings.

FIG. 5 is a side view of a ramp member in accordance with the present invention.

FIG. 6 is a side view of a ramp member in accordance with the present invention.

FIG. 7 is a side view of a ramp member in accordance with the present invention.

FIG. 8 is a side view of a ramp member in accordance with the present invention.

FIG. 12 is a side view of a further example of an assembled ramp in accordance with the present invention.

FIG. 13 is a side view of a still further example of an assembled ramp in accordance with the present invention.

DETAILED DESCRIPTION OF THE PREFERRED EMBODIMENT

The following is a detailed description of the best presently known mode of carrying out the invention. This description is not to be taken in a limiting sense, but is made merely for the purpose of illustrating the general principles of the invention. The scope of the invention is defined by the appended claims.

Figure 1:
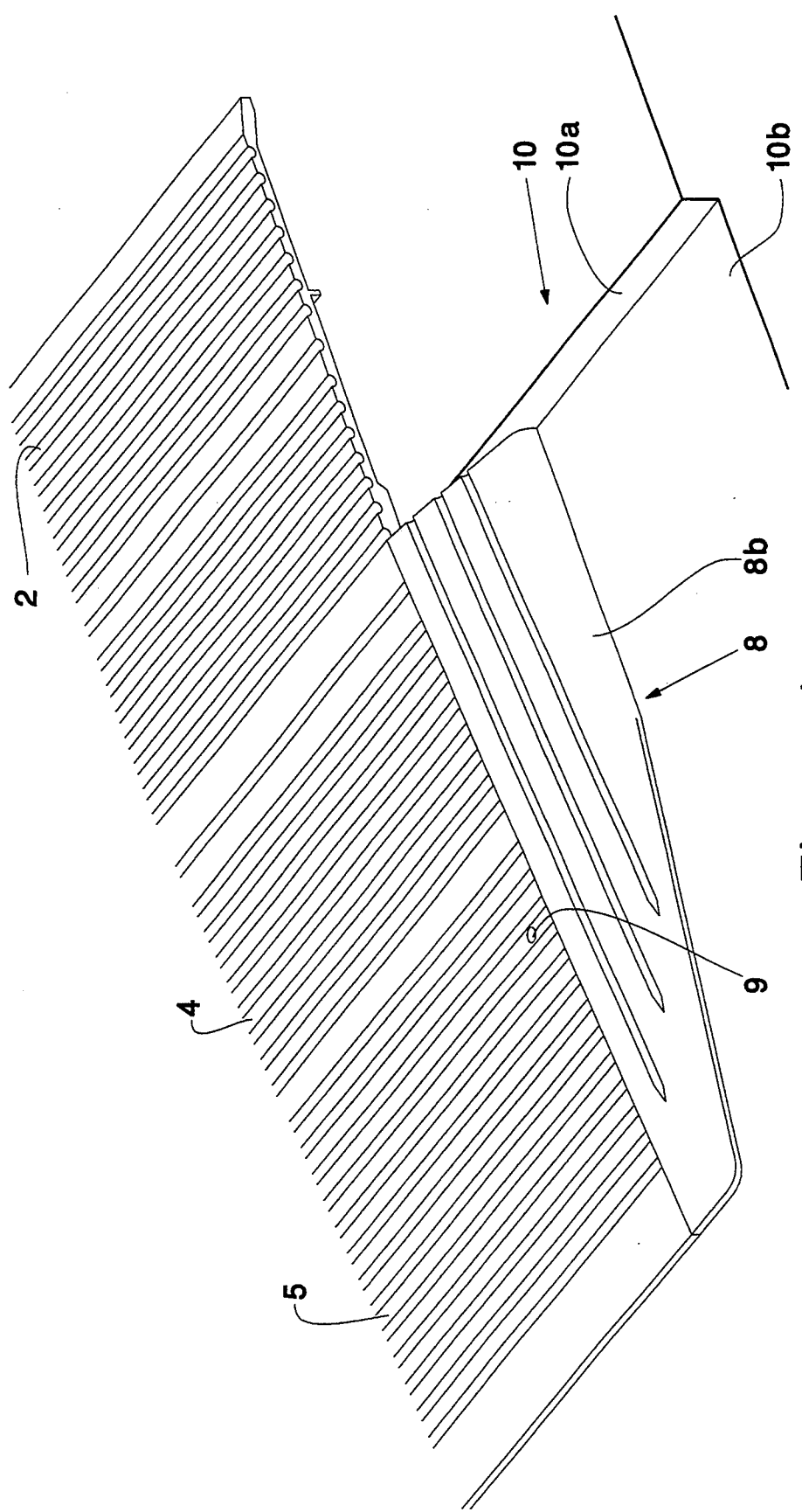
FIG. 1 is a perspective view of one end of an assembled modular ramp in accordance with the present invention.

In accordance with a preferred embodiment of the present invention, the modular ramp system may include a planar ramp member 1, a top plate 2, a ramp support 3, a ramp member 4, a ramp member 5, a ramp member 6, a ramp member 7, and a skirt 8. All elements are made of metal, preferably aluminum. These elements are illustrated individually in FIGS. 2–9, respectively. As will be apparent from the following description, the elements may be arranged in various combinations in order to provide a properly sized ramp for a given threshold. For example, FIG. 1 illustrates one example of a combination of components installed at a threshold 10 having an offset 10a. This combination includes top plate 2, ramp member 4, ramp member 5, and two skirts 8 (one of which is shown) which may each be attached to ramp member 5 by, for example, a screw 9.

Figures 2, 3, 4:
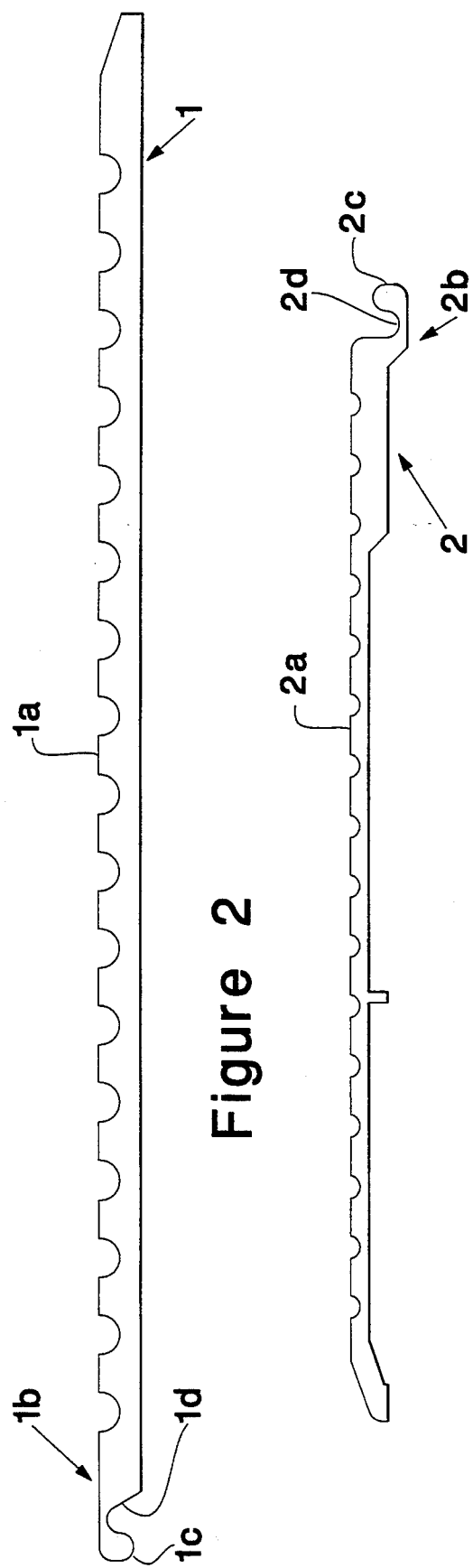
FIG. 2 is a side view of a variable ramp in accordance with the present invention.
FIG. 3 is a side view of a top plate in accordance with the present invention.
FIG. 4 is a side view of a variable ramp support in accordance with the present invention.

In a preferred embodiment, the planar ramp member 1 shown in FIG. 2 includes a ¼" thick ramp portion 1a and an attachment member 1b having a downwardly projecting lip, or ledge, 1c and a downwardly opening recess 1d located between portion 1a and lip 1c. The lip 1c and the recess 1d forming a hook. The top plate 2 shown in FIG. 3 includes a ¼" thick top portion 2a and an attachment member 2b having an upwardly projecting lip, or ledge, 2c and an upwardly opening recess 2d located between portion 2a and lip 2c. The ramp member 1 and top plate 2 are approximately 10" and 7" in length, respectively. The ramp support member 3 shown in FIG. 4 is approximately ¾" in height and defines a radius of 1". The preferred embodiment may be used with offsets having a height of up to 1¼" and still comply with the ADAAG (optional 1:8 slope). Ramp support member 3 is postionable at any point along the length of member 2 in order to provide firm support regardless of the exact height of offset 13.

The cooperation of attachment members 1b and 2b is illustrated for example in FIG. 13. Lips 1c and 2c engage in recesses 2d and 1d, respectively, to form an interlocking mechanical attachment via which member 1 and top plate 2 are securely held together without requiring any type of permanent or semipermanent bond such as cement or a weld.

Referring to FIG. 5, ramp member 4 preferably includes vertical ramp supports 4a–c of varying height, a downwardly facing attachment member 4d, an upwardly facing attachment member 4e and a ramp portion 4f, all forming part of a single metal piece. The ramp member 4 is approximately 1" and ½" in height at the high and low ends, respectively, and 6¼" in length (measured horizontally). The ramp member 5 shown in FIG. 6 includes vertical ramp supports 5a and 5b, a downwardly facing attachment member 5c and a ramp portion 5d, all forming part of a single metal piece. The ramp member 5 ranges in height from approximately ½" at its high end to just above ground level and is 6⅜" in length (measured horizontally).

Ramp member 6 shown in FIG. 7 includes vertical ramp supports 6a and 6b, a downwardly facing attachment member 6c, an upwardly facing attachment member 6d and a ramp portion 6e, all forming part of a single metal piece. Ramp member 6 is approximately ¾" and ½" in height at the high and low ends, respectively, and 3⅛" in length.

Similarly, the ramp member 7 shown in FIG. 8 includes vertical ramp supports 7a and 7b, a downwardly facing attachment member 7c, an upwardly facing attachment member 7d, and ramp portion 7e. Ramp 7 is approximately 1¼" and 1" in height at the high and low ends, respectively, and 3⅛" in length.

Figure 9:
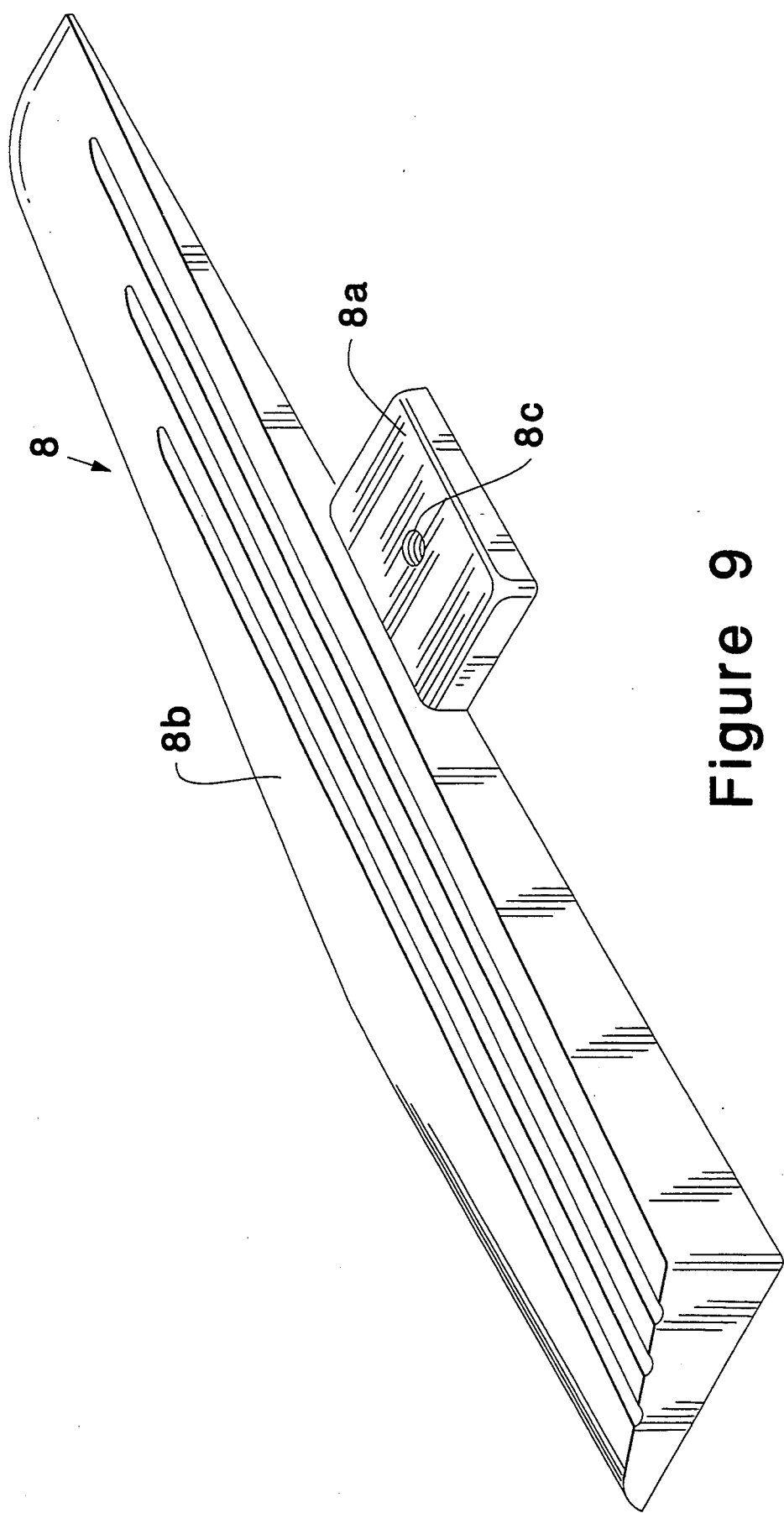
FIG. 9 is a perspective view of a skirt in accordance with the present invention.

As illustrated for example in FIG. 9, the forged aluminum skirt 8 includes a tab 8a for positioning the skirt adjacent the ramp members and a screw hole 8c which may be formed during installation to accept a self-tapping screw. Additionally, the skirt includes a surface 8b which extends from ground level 10b adjacent threshold 10 to the sides of the ramp members. The skirts may be of lengths appropriate for assembly in the manner illustrated for example in FIG. 1.

Figure 10:
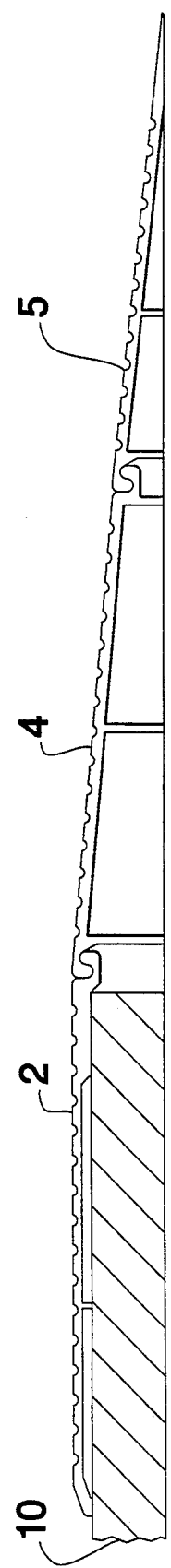
FIG. 10 is a side view of one example of an assembled modular ramp in accordance with the present invention.
Figure 11:
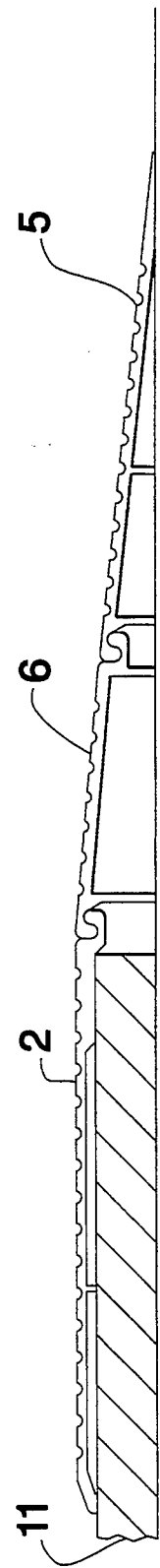
FIG. 11 is a side view of another example of an assembled modular ramp in accordance with the present invention.

The modular ramp may be assembled in various ways employing top plate 2. First, ramp members 4 and 5, and top plate 2 may be used at a ¾" offset 10 as illustrated for example in FIG. 10. Additionally, ramp members 5 and 6, and top plate 2 may be used in conjunction with a ½" offset 11 as illustrated for example in FIG. 11. Further, ramp members 4, 5 and 7, and top plate 2 may be used at a 1" offset 12 as illustrated for example in FIG. 12. Finally, the ramp member 1, the top plate 2, and the ramp support 3 may be installed at a threshold having an offset 13 in the manner illustrated, for example in FIG. 13.

Figure 14:
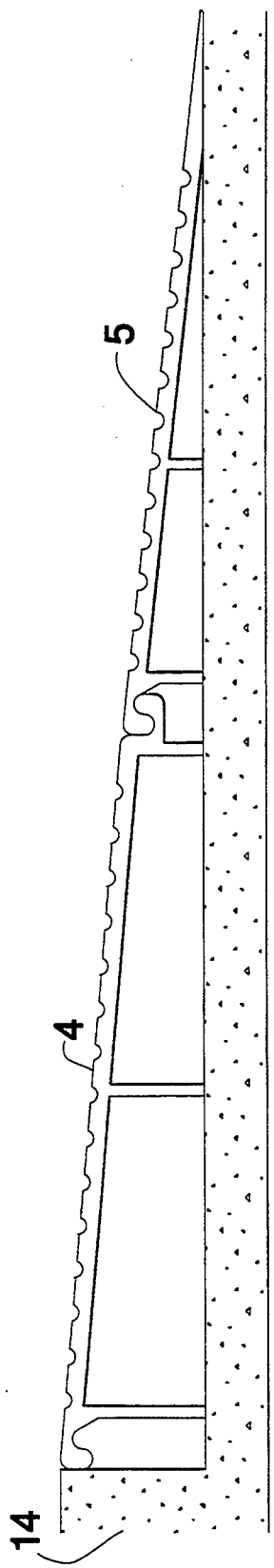
FIG. 14 is a side view of a still further example of an assembled ramp in accordance with the present invention.
Figure 15:
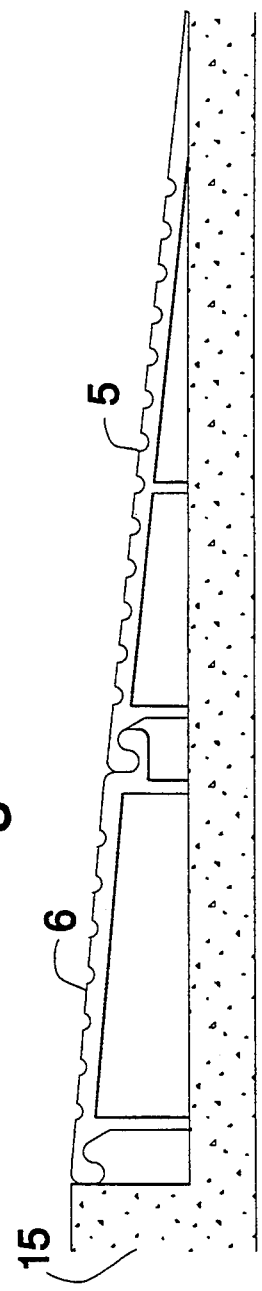
FIG. 15 is a side view of a still further example of an assembled ramp in accordance with the present invention.
Figure 16:
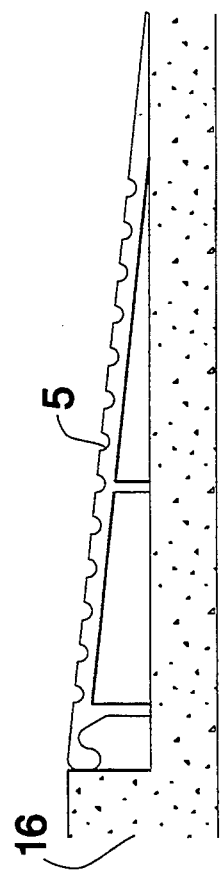
FIG. 16 is a side view of a still further example of a ramp in accordance with the present invention.
Figure 17:
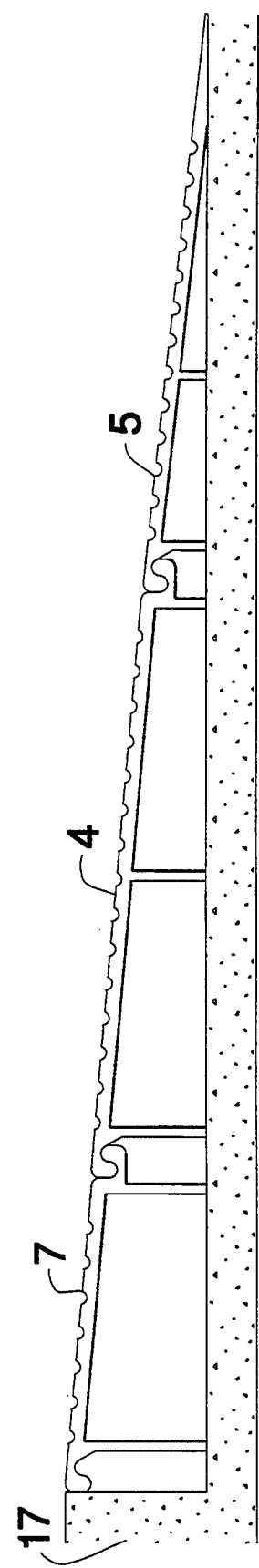
FIG. 17 is a side view of a still further example of an assembled ramp in accordance with the present invention.
Figure 18:
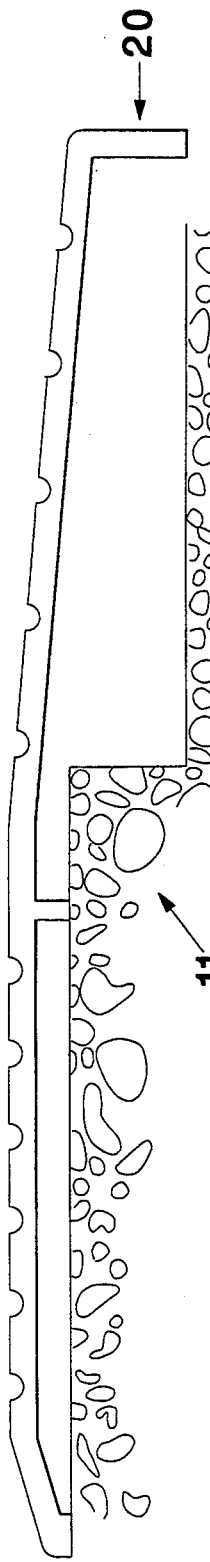
FIGS. 18, 19 and 20 are side views of prior art ramp structures.
Figure 19:
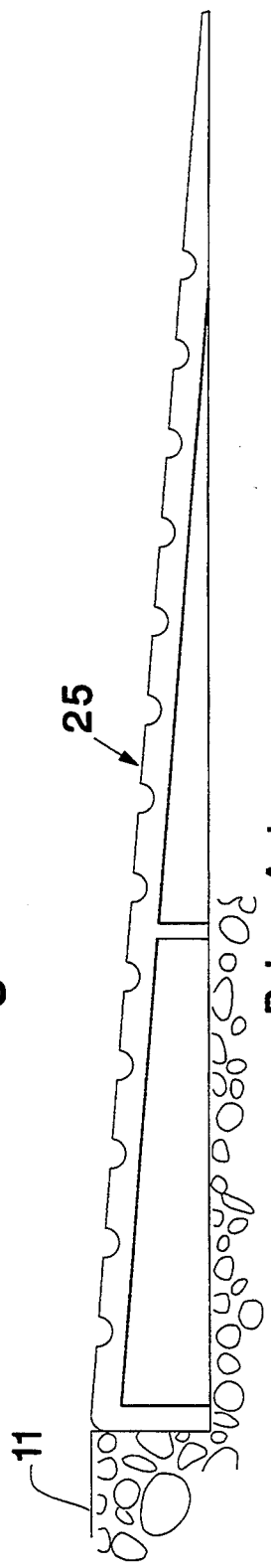
Figure 20:
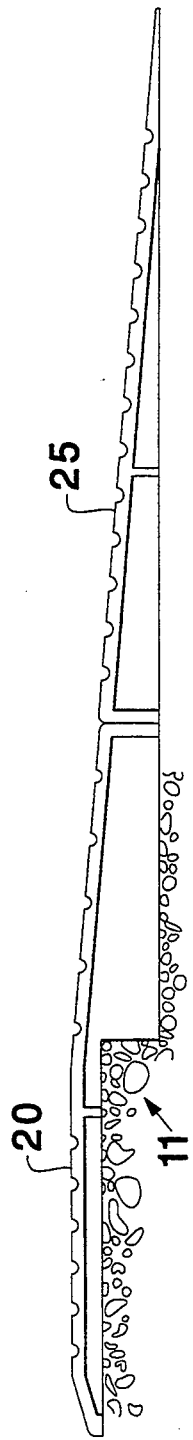

The modular ramp may also be assembled in various ways without top plate 2. First, ramp members 4 and 5 may be used alone at a 1" offset 14 as illustrated for example in FIG. 14. Additionally, ramp members 5 and 6 may be used in conjunction with a ¾" offset 15 as illustrated for example in FIG. 15. Further, ramp member 5 may be used in conjunction with a ¼" offset 16 as illustrated for example in FIG. 16. Finally, ramp members 4, 5 and 7 may be used at a 1¼" offset 17 as illustrated for example in FIG. 17.

In accordance with the present invention, the ramp members may be affixed to the ground by mastic or other similar means. Further, the ramp portions of the ramp members may include a skid resistant finish such as PemKote ™. Alternatively, or in addition, each ramp member, top plate and skirt may be grooved, as shown, to improve traction. Finally, the ramp members may be fabricated by extrusion or other known metal fabrication processes.

Although the present invention has been described in terms of a preferred embodiment above, numerous modifications and/or additions to the above-described preferred embodiment would be readily apparent to one skilled in the art. It is intended that the scope of the present invention extends to all such modifications and/or additions and that the scope of the present invention is limited solely by the claims set forth below.

I claim:

1. A modular ramp kit having components capable of being assembled by mating first interengageable attachment members with complementarily shaped second interengageable attachment members, said components for use in conjunction with a threshold defining an offset, the kit comprising the combination of:
    a top plate for covering a top portion of the threshold, said top plate including one of said first interengageable attachment members,
    a first ramp, the first ramp defining an upper end having a height A and lower end having a lesser height B, the upper end of the first ramp including one of said second interengageable attachment members for attachment to the top plate, said lower end of said first ramp including one of said first interengageable attachment members,
    a second ramp, the second ramp defining an upper end having said height B and a lower end having a lesser height C, the upper end of the second ramp including one of said second interengageable attachment members for attachment to the lower end of the first ramp, said lower end of the second ramp including one of said first interengageable attachment members,
    a third ramp, the third ramp defining an upper end having said height C and a lower end, the upper end of the third ramp including one of said second interengageable attachment members for attachment to the lower end of the second ramp, and
    two skirts each adapted to be placed adjacent a respective side of at least the third ramp, each skirt defining a surface extending downwardly from the third ramp to a ground surface upon which the modular ramp is placed, each skirt and one of the ramps having mutually engageable attachment surfaces for securing each skirt to the third ramp.

2. The modular ramp kit of claim 1, wherein each skirt includes a tab defining one of the attachment surfaces and adapted to be placed under the third ramp and position the skirt relative the to third ramp.

3. A modular ramp kit as defined in claim 1 wherein each of said interengageable attachment members comprises a hook having a substantially curved free end formed to permit said first and second interengageable attachment members to be readily disassembled from one another.

4. A modular ramp kit as defined in claim 3 wherein said curved free end of each of said first interengageable attachment members extends upwardly and said curved free end of each of said second interengageable attachment members extends downwardly.

* * * * *